US011961392B2

(12) United States Patent
Tabkhivayghan et al.

(10) Patent No.: US 11,961,392 B2
(45) Date of Patent: Apr. 16, 2024

(54) WORKER-IN-THE-LOOP REAL TIME SAFETY SYSTEM FOR SHORT-DURATION HIGHWAY WORKZONES

(71) Applicant: The University Of North Carolina At Charlotte, Charlotte, NC (US)

(72) Inventors: Hamed Tabkhivayghan, Charlotte, NC (US); Omidreza Shoghli, Charlotte, NC (US)

(73) Assignee: The University Of North Carolina At Charlotte, Charlotte, NC (US)

( * ) Notice: Subject to any disclaimer, the term of this patent is extended or adjusted under 35 U.S.C. 154(b) by 0 days.

(21) Appl. No.: 17/685,605

(22) Filed: Mar. 3, 2022

(65) Prior Publication Data

US 2022/0383732 A1 Dec. 1, 2022

Related U.S. Application Data

(60) Provisional application No. 63/156,404, filed on Mar. 4, 2021.

(51) Int. Cl.
*G08G 1/005* (2006.01)
*G06V 10/82* (2022.01)
*G06V 20/54* (2022.01)
*G08G 1/01* (2006.01)
*H04N 7/18* (2006.01)

(52) U.S. Cl.
CPC ............ *G08G 1/005* (2013.01); *G06V 10/82* (2022.01); *G06V 20/54* (2022.01); *G08G 1/0133* (2013.01); *H04N 7/18* (2013.01); *G06V 2201/08* (2022.01)

(58) Field of Classification Search
None
See application file for complete search history.

(56) References Cited

U.S. PATENT DOCUMENTS

| 5,486,819 A * | 1/1996 | Horie | G08G 1/164 |
| | | | 348/148 |
| 9,846,999 B1 * | 12/2017 | Pickover | H04M 1/72403 |
| 10,984,644 B1 * | 4/2021 | Alsahlawi | G08B 25/10 |
| 11,295,140 B2 * | 4/2022 | Wang | G06V 10/454 |

(Continued)

OTHER PUBLICATIONS

Kinam Kim, Hongjo Kim, Hyoungkwan Kim,Image-based construction hazard avoidance system using augmented reality in wearable device, Automation in Construction, vol. 83,2017, pp. 390-403, (Year: 2017).*

(Continued)

*Primary Examiner* — Stefan Gadomski
(74) *Attorney, Agent, or Firm* — Clements Bernard Walker; Christopher L. Bernard

(57) ABSTRACT

An edge device for monitoring safety of a highway work zone is disclosed. The edge device includes at least one camera, one or more processors, and memory. The at least one camera is configured to capture images in sequence. The memory stores computer-executable instructions that, when executed, cause the one or more processors to: perform vehicle detection over an input of a data stream of the images, from the at least one camera, utilizing just-in-time processing; determine a level of safety by tracking vehicles detected and performing a time sequence analysis of the vehicles; and send a signal to one or more assisted reality devices indicating the level of safety thereto.

20 Claims, 9 Drawing Sheets

(56) References Cited

U.S. PATENT DOCUMENTS

| | | | |
|---|---|---|---|
| 11,409,304 B1* | 8/2022 | Cai | B60W 60/001 |
| 11,562,115 B2* | 1/2023 | Boesch | G06N 3/084 |
| 2012/0162431 A1* | 6/2012 | Riesebosch | G08G 1/04 348/149 |
| 2017/0097227 A1* | 4/2017 | Sanders | G01S 17/89 |
| 2017/0323161 A1* | 11/2017 | Du | G06V 40/174 |
| 2018/0189642 A1* | 7/2018 | Boesch | G06N 3/044 |
| 2019/0012170 A1* | 1/2019 | Qadeer | G06F 9/30112 |
| 2019/0179795 A1* | 6/2019 | Huang | G06N 3/08 |
| 2019/0180170 A1* | 6/2019 | Huang | G06N 3/08 |
| 2019/0266893 A1* | 8/2019 | Sambo | G08G 1/20 |
| 2019/0340909 A1* | 11/2019 | Nguyen | B25J 9/1676 |
| 2020/0133989 A1* | 4/2020 | Song | G06F 17/15 |
| 2020/0151088 A1* | 5/2020 | Gu | G06N 3/063 |
| 2020/0160159 A1* | 5/2020 | Azari | G06N 3/044 |
| 2020/0175392 A1* | 6/2020 | Tang | G06N 3/045 |
| 2020/0272779 A1* | 8/2020 | Boesch | G06F 9/3897 |
| 2020/0401895 A1* | 12/2020 | Litvak | G06F 17/15 |
| 2021/0064872 A1* | 3/2021 | Kim | G06N 3/045 |
| 2021/0081763 A1* | 3/2021 | Abdelfattah | G06N 5/01 |
| 2021/0114638 A1* | 4/2021 | Cross | B61L 23/06 |
| 2021/0118304 A1* | 4/2021 | Teuss | G08G 1/161 |
| 2021/0158207 A1* | 5/2021 | Alsahlawi | G06Q 10/0639 |
| 2021/0169417 A1* | 6/2021 | Burton | A61B 5/4857 |
| 2021/0248456 A1* | 8/2021 | Guo | G06N 3/04 |
| 2021/0279482 A1* | 9/2021 | Choi | B60W 10/20 |
| 2022/0051094 A1* | 2/2022 | Chentanez | G06N 3/045 |
| 2022/0058401 A1* | 2/2022 | Kang | G06T 7/70 |
| 2022/0147565 A1* | 5/2022 | Chalasani | G06F 16/7867 |
| 2022/0172594 A1* | 6/2022 | Cho | G08B 21/0446 |
| 2022/0237444 A1* | 7/2022 | Wigington | G06N 3/04 |

OTHER PUBLICATIONS

J. Fang, Y. Zhou, Y. Yu and S. Du, "Fine-Grained Vehicle Model Recognition Using A Coarse-to-Fine Convolutional Neural Network Architecture," in IEEE Transactions on Intelligent Transportation Systems, vol. 18, No. 7, pp. 1782-1792, Jul. 2017, doi: 10.1109/TITS.2016.2620495. (Year: 2017).*

Wu et al. Real-time mixed reality-based visual warning for construction workforce safety. Automation in Construction, 139, 104252, 2022.

Gambatese et al., Work zone intrusion alert technologies: assessment and practical guidance. Technical report, Oregon. Dept. of Transportation. Research Section, 2017.

Hakkarainen et al., Augmented assembly using a mobile phone. In 7th IEEE/ACM International Symposium on Mixed and Augmented Reality, pp. 167-168, Sep.

Moghaddam et al., Exploring augmented reality for worker assistance versus training. Advanced Engineering Informatics, 50, 101410, 2021.

Huang et al., Effectiveness of graphic-aided portable changeable message signs in reducing vehicle speeds in highway work zones. Transportation research part C: emerging technologies, 48: pp. 311-321, 2014.

Klinker et al., Augmented maintenance of powerplants: a prototyping case study of a mobile ar system. In Proceedings IEEE and ACM International Symposium on Augmented Reality, pp. 124-133, Oct. 2001.

Li et al., A critical review of virtual and augmented reality (vr/ar) applications in construction safety. Automation in Construction, 86: pp. 150-162, 2018.

Park et al., A framework for construction safety management and visualization system. Automation in Construction, 33: pp. 95-103, 2013.

Traskbaack et al., Mixed reality training application for an oil refinery: User requirements. In Proceedings of the 2004 ACM SIGGRAPH International Conference on Virtual Reality Continuum and Its Applications in Industry, VRCAI '04, pp. 324-327, New York, NY, USA, 2004.

Abraham et al., Augmented reality is already improving worker performance. Harvard Business Review, 13, pp. 1-5.2017.

Lorenz et al., Industrial augmented reality: Requirements for an augmented reality maintenance worker support system. In 2018 IEEE International Symposium on Mixed and Augmented Reality Adjunct (ISMAR-Adjunct), pp. 151-153, 2018, October.

Lai et al., Smart augmented reality instructional system for mechanical assembly towards worker-centered intelligent manufacturing. Journal of Manufacturing Systems, 55, pp. 69-81, 2020.

Lampen et al., Combining simulation and augmented reality methods for enhanced worker assistance in manual assembly. Procedia Cirp, 81, pp. 588-593, 2019.

Zillner et al., Augmented reality remote collaboration with dense reconstruction. In 2018 IEEE International Symposium on Mixed and Augmented Reality Adjunct (ISMAR-Adjunct), pp. 38-39, Oct. 2018.

Ahmed., A review on using opportunities of augmented reality and virtual reality in construction project management. Organization, Technology and Management in Construction: An International Journal, 11(1), pp. 1839-1852, 2019.

Aromaa et al., User evaluation of industry 4.0 concepts for worker engagement. In International conference on human systems engineering and design: Future trends and applications pp. 34-40, Oct. 2018.

Simoes et al., Cross reality to enhance worker cognition in industrial assembly operations. The International Journal of Advanced Manufacturing Technology, 105(9), pp. 3965-3978, 2019.

Bowman et al., . BuildAR: A Proof-of-Concept Prototype of Intelligent Augmented Reality in Construction. In 2022 IEEE Conference on Virtual Reality and 3D User Interfaces Abstracts and Workshops (VRW) pp. 508-512, 2022.

Ramos-Hurtado, J., Rivera, M. L., Mora-Serrano, J., Deraemaeker, A., & Valero, I. (2022). Proposal for the Deployment of an Augmented Reality Tool for Construction Safety Inspection. Buildings, 12(4), 500.

Kilmant et al., Concepts for creating augmented reality based technical documentations for the maintenance of machine tools. International Journal on Interactive Design and Manufacturing, pp. 1-9, 2022.

Ha et al., Towards wearable cognitive assistance. In Proceedings of the 12th Annual International Conference on Mobile Systems, Applications, and Services, MobiSys '14, pp. 68-81, New York, NY, USA, 2014. ACM.

Hourdos., Portable, non-intrusive advance warning devices for work zones with or without flag operators, pp. 1-47, Oct. 2012.

Wang et al., Evaluation of innovative traffic safety devices at short-term work zones. Report K-TRAN: KU-09-5, The University of Kansas, 2011.

Jeon et al., YOLO-based lane detection system. Journal of the Korea Institute of Information and Communication Engineering, 25 (3), 464-470, 2021, https://doi.org/10.6109/JKIICE.2021.25.3.464.

Baek et al., Vehicle trajectory prediction and collision warning via fusion of multisensors and wireless vehicular communications. Sensors, 20(1), pp. 1-26, 2020.

Mollenhauer et al. Design and Evaluation of a Connected Work Zone Hazard Detection and Communication System for Connected and Automated Vehicles (CAVs), pp. 1-35, 2019.

Song et al., Learning to predict vehicle trajectories with model-based planning. In Conference on Robot Learning, pp. 1035-1045, Jan. 2022.

Sun et al., See the future: A semantic segmentation network predicting ego-vehicle trajectory with a single monocular camera. IEEE Robotics and Automation Letters, pp. 3066-3073, 2020.

Awolusi, I., & Marks, E. D. (2019). Active work zone safety: Preventing accidents using intrusion sensing technologies. Frontiers in built environment, 5, 21.

Chan, K., Louis, J., & Albert, A. (2020). Incorporating worker awareness in the generation of hazard proximity warnings. Sensors, 20(3), 806.

Sakhakarmi, S., & Park, J. (2022). Improved intrusion accident management using haptic signals in roadway work zone. Journal of safety research, 80, 320-329.

(56) References Cited

OTHER PUBLICATIONS

Kim, Y., Baek, J., & Choi, Y. (2021). Smart Helmet-Based Personnel Proximity Warning System for Improving Underground Mine Safety. Applied Sciences, 11(10), 4342.

Roofigari-Esfahan, N., White, E., Mollenhauer, M., & Talledo Vilela, J. P. (2021). Development of a Connected Smart Vest for Improved Roadside Work Zone Safety.

Mishra, S., Golias, M.M. and Thapa, D., 2021. Work Zone Alert Systems (No. RES2019-01). Tennessee. Department of Transportation.

Ergan, S., Khan, J.A., Bernardes, S.D., Zou, Z., Lu, D. and Shen, Y., 2021. Work Zone Safety: Behavioral Analysis with Integration of VR and Hardware in the Loop (HIL).

Park, J. and Sakhakarmi, S., 2019. Embedded Safety Communication System for Robust Hazard Perception of Individuals in Work Zones.

* cited by examiner

WORKER-IN-THE-LOOP REAL TIME SAFETY SYSTEM FOR SHORT-DURATION HIGHWAY WORKZONES

CROSS-REFERENCE TO RELATED APPLICATION

The present disclosure claims the benefit of priority of U.S. Provisional Patent Application 63/156,404, filed on Mar. 4, 2021, and entitled "WORKER-IN-THE-LOOP REAL-TIME SAFETY SYSTEM FOR SHORT-DURATION HIGHWAY WORKZONES," the contents of which are incorporated in full by reference herein.

GOVERNMENT SUPPORT CLAUSE

This invention was made with government support under 1932524 awarded by the National Science Foundation (NSF). The government has certain rights in the invention.

FIELD OF THE DISCLOSURE

The present disclosure generally relates to safety alert systems. More particularly, the present disclosure relates to systems and methods for alerting individuals working on or near a highway of potential danger.

BACKGROUND OF THE DISCLOSURE

Highway work zones are considered among the most hazardous environments. In 2018 alone, the Federal Highway Administration (FHWA) reported that 124 workers lost their lives at road construction sites. Road construction sites, often referred to as work zones, are typically classified in groups based on a duration that the construction site will be in operation. According to the Manual on Uniform Traffic Control Devices (MUTCD), work zones are divided into five major categories: (1) permanent (long-duration); (2) intermediate-duration; (3) short-duration stationary; (4) short-duration; and (5) mobile. Long-duration and intermediate duration are stationary work zones with durations greater than one day. Work zones that exist at one location only during a single daylight period can be classified as short-duration stationary. If the duration is less than one hour, it is called short-duration work zone. A mobile work zone is a work zone that is constantly changing its location (e.g. mowing or patching).

The MUTCD requires the use of various safety measures for the work zone based on the category of the work zone. For example, short-duration work zones require the use of a flashing strobe light and a sign at the back of a truck. Short-duration work zones are particularly dangerous due to the limited numbers of safety devices that are deployed for alerting incoming traffic. Highway work zone safety technologies include portable signs, automated flaggers, directional alarms, warning lights, and work zone intrusion alert technologies. Intrusion alert technologies have been proved to enhance safety in work zones by means of transmitting warnings to workers of the intrusion so that the workers can take an appropriate action to avoid the intrusion. Intrusion alert technologies are different in the way they are triggered. They range from impact/pressure-activated systems to systems that use sensing technologies to identify the intrusion. However, they are all triggered once the vehicle intrudes the work zone, which does not provide the worker with much time to take action to avoid the intrusion. Further deficiencies of current systems include long set-up times, false alarms, misfires, and alignment difficulties.

The above-described background relating to work zone safety is merely intended to provide a contextual overview of some current issues and is not intended to be exhaustive. Other contextual information may become apparent to those of ordinary skill in the art upon review of the following description of exemplary embodiments.

BRIEF SUMMARY OF THE DISCLOSURE

In various embodiments, the present disclosure relates to a highway safety system configured to alert individuals working on or near a highway of potential danger. In particular, the highway safety system provides real-time notifications/warnings to highway workers through assisted reality devices (such as augmented reality glasses) while the highway workers are in a work zone when a work zone intrusion is about to happen.

The highway safety system is a proactive safety system including real-time deep learning algorithm design and processing, edge computing, and assisted reality devices to provide real-time prediction of work zone intrusions and real-time notifications/warnings to highway workers. Providing real-time notifications/warnings to highway workers is of particular use for short-duration highway work zones and other dangerous work zones for individuals outside of vehicles, such as first responders (police officers, firefighters, paramedics) at the scene of an accident, which have high safety risks due to a lack of long term safety mechanisms. Due to the real-time notifications/warnings provided by the highway safety system, highways can be safer highway workers, such as construction workers and first responders by preventing potential fatalities or injuries caused by highway work zones (construction zones, traffic accident sites, the shoulder of the road with a police officer out of his vehicle, and the like)

In one illustrative embodiment, the present disclosure provides An edge device for monitoring safety of a highway work zone. The edge device includes at least one camera, one or more processors, and memory. The at least one camera is configured to capture images in sequence. The memory stores computer-executable instructions that, when executed, cause the one or more processors to: perform vehicle detection over an input of a data stream of the images, from the at least one camera, utilizing just-in-time processing; determine a level of safety by tracking vehicles detected and performing a time sequence analysis of the vehicles; and send a signal to one or more assisted reality devices indicating the level of safety thereto.

In another illustrative embodiment, the present disclosure provides a highway safety system. The highway safety system includes one or more assisted reality devices and an edge device. The one or more assisted reality devices is configured to communicate a level of safety to a user. The edge device includes at least one camera, one or more processors, and memory. The at least one camera is configured to capture images in sequence. The memory stores computer-executable instructions that, when executed, cause the one or more processors to: perform vehicle detection over an input of a data stream of the images, from the at least one camera, utilizing just-in-time processing; determine the level of safety by tracking vehicles detected and performing a time sequence analysis of the vehicles; and send a signal to one or more assisted reality devices indicating the level of safety thereto.

In a further illustrative embodiment, the present disclosure provides a method for highway safety. The method includes positioning an edge device at a boundary between a work zone and a road, the edge device including at least one camera configured to capture images in sequence and one or more processors. The method also includes providing one or more assisted reality devices to a user. The method further includes performing vehicle detection, at the edge device, over an input of a data stream of the images, from the at least one camera, utilizing just-in-time processing. The method yet further includes determining a level of safety, at the edge device, by tracking vehicles detected and performing a time sequence analysis of the vehicles. The method still further includes sending a signal from the edge device to the one or more assisted reality devices indicating the level of safety thereto. The method yet also includes communicating, from the one or more assisted reality devices, the level of safety to the user.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
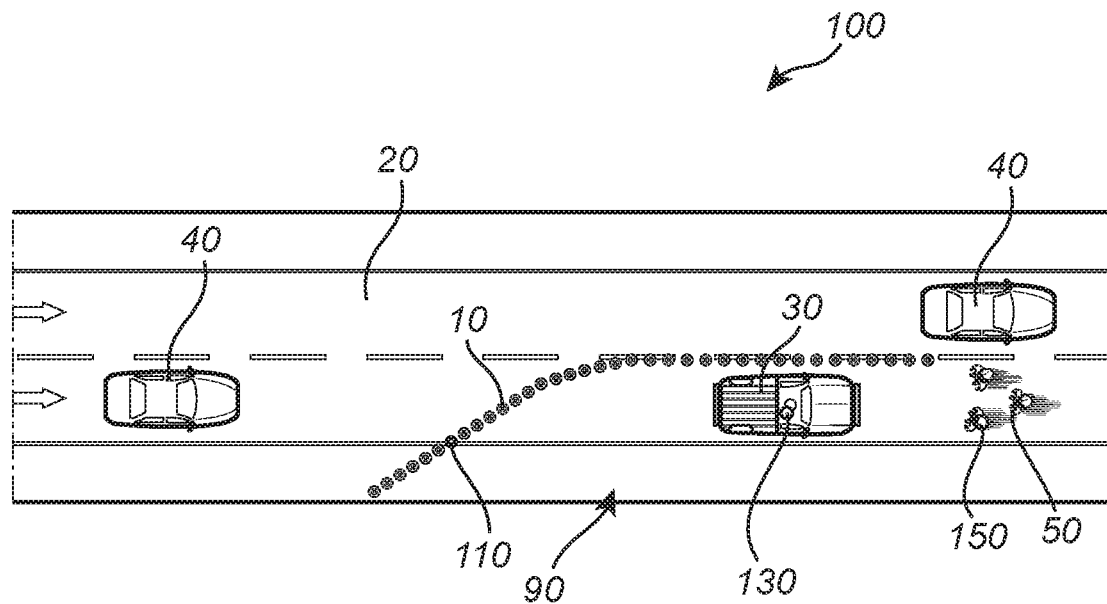
FIG. 1 is a schematic illustration of a highway safety system implemented in a work zone in accordance with an embodiment of the present disclosure.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Again, in various embodiments, the present disclosure relates to a highway safety system configured to alert individuals working on or near a highway of potential danger. In particular, the highway safety system provides real-time notifications/warnings to highway workers through assisted reality devices (such as augmented reality glasses and smart watches) while the highway workers are in a work zone when a work zone intrusion is about to happen.

The highway safety system is a proactive safety system including real-time deep learning algorithm design and processing, edge computing, and assisted reality devices to provide real-time prediction of work zone intrusions and real-time notifications/warnings to highway workers. Providing real-time notifications/warnings to highway workers is of particular use for short-duration highway work zones and other dangerous work zones for individuals outside of vehicles, such as first responders (police officers, firefighters, paramedics) at the scene of an accident, which have high safety risks due to a lack of long term safety mechanisms. Due to the real-time notifications/warnings provided by the highway safety system, highways can be safer highway workers, such as construction workers and first responders by preventing potential fatalities or injuries caused by highway work zones (construction zones, traffic accident sites, the shoulder of the road with a police officer out of his vehicle, and the like).

Figure 2:
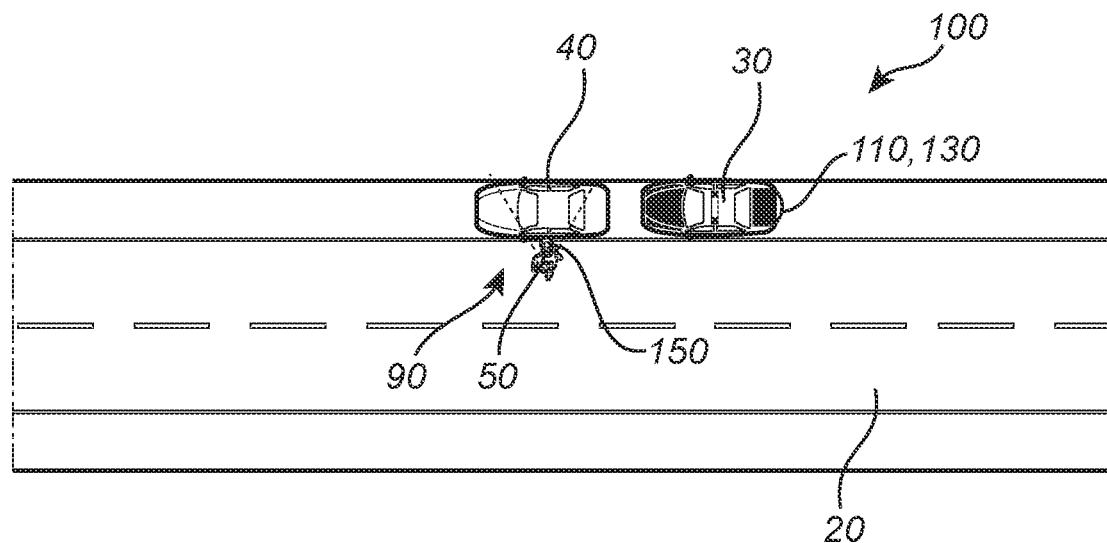
FIG. 2 is a schematic illustration of the highway safety system implemented in another work zone in accordance with an embodiment of the present disclosure.
Figure 3:
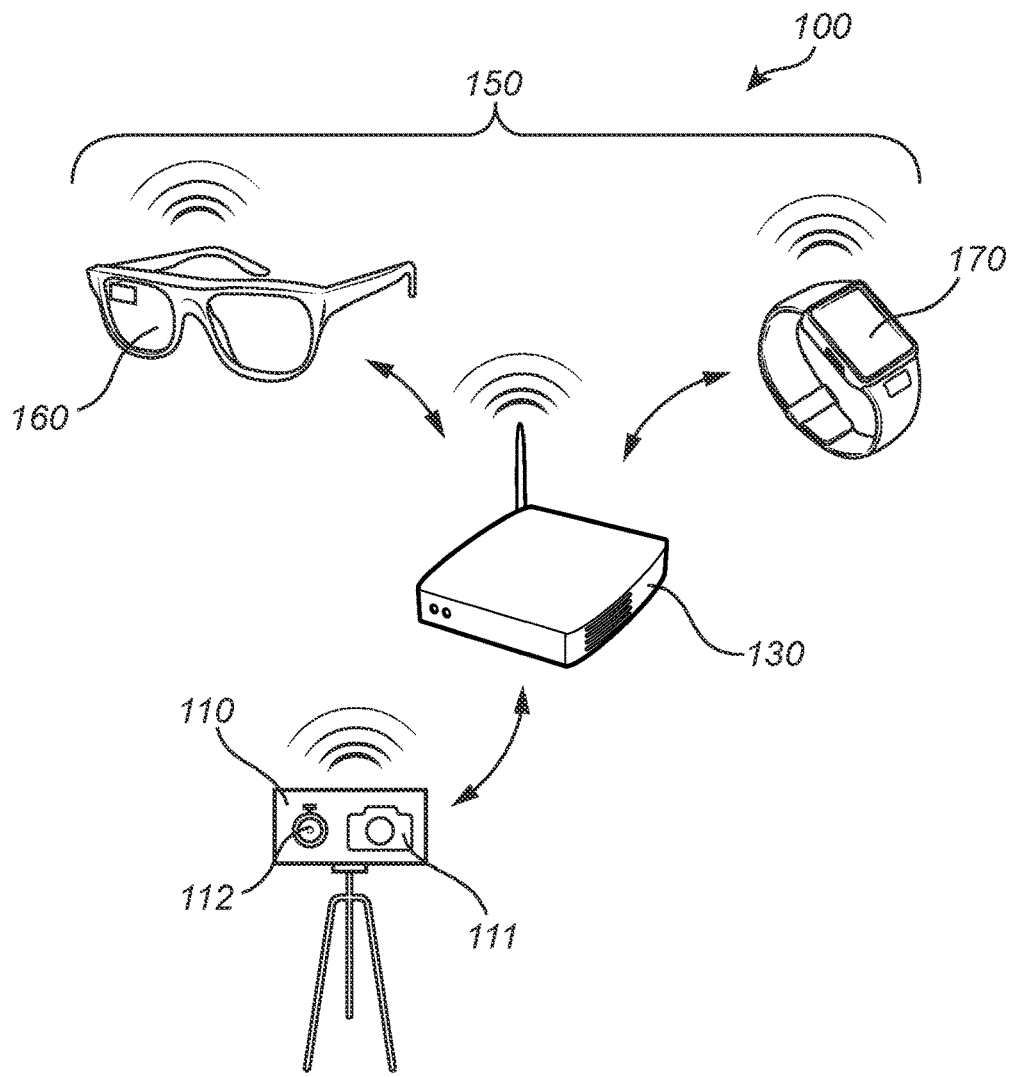
FIG. 3 is a schematic illustration of the highway safety system in accordance with an embodiment of the present disclosure.

FIG. 1 is a schematic illustration of a highway safety system 100 implemented in a work zone 90 in accordance with an embodiment of the present disclosure. FIG. 2 is a schematic illustration of the highway safety system 100 implemented in another work zone 90 in accordance with an embodiment of the present disclosure. FIG. 3 is a schematic illustration of the highway safety system 100 in accordance with an embodiment of the present disclosure. Referring to FIGS. 1-3, in embodiments, the highway safety system 100 includes an edge device 110 and one or more assisted reality devices 150. The edge device 110 includes one or more cameras 111, 112 and is configured to (1) process a real-time feed from the cameras to predict risk-causing events and (2) alert a person 50 in the work zone 90 of a risk-causing event by sending a signal to the one or more assisted reality devices 150 possessed by the person 50. Risk-causing events can include potential intrusion/dangerous maneuvers of vehicles 40 travelling on a road 20 associated with the work zone 90, such as a road 20 that is adjacent to, adjoining, and/or including a work zone 90, dangerous weather, poor lighting conditions, and the like. In embodiments, the one or more cameras 111, 112 include a red, green, blue (RGB) camera 111 and a thermal/infrared camera 112.

In embodiments, the assisted reality devices 150 are wearable devices, such as augmented reality glasses 160 and smart watches 170, that a worn by the person 50 while the person 50 is in the work zone 90. The one or more assisted reality devices 150 are configured to receive the signal from the edge device 110 and issue an alert to the person 50 via one or more of displays on the assisted reality devices 150, sounds generated by the assisted reality devices 150, vibration of the assisted reality devices 150, and the like.

In embodiments, the highway safety system 100 also includes a networking device 130 that is configured to establish a local network for providing communication between the edge device 110 and the assisted reality devices 150. In other embodiments, the edge device 110 and the assisted reality devices 150 communicate directly, and in further embodiments, the edge device 110 includes the networking device 130.

Referring to FIG. 1, in embodiments, the work zone 90 is a construction zone. The edge device 110 is positioned at a boundary of the work zone 90, between the work zone 90 and oncoming traffic. In the embodiment illustrated, the boundary is defined by traffic channeling devices 10, such as traffic cones, temporary barriers, and the like. In some of these embodiments, the edge device 110 is positioned on or adjacent to one of the traffic channeling devices 10. In some embodiments, the networking device 130 is positioned in a work vehicle 30.

Referring to FIG. 2, in embodiments, the work zone 90 is an area that an emergency responder is operating in, such as an area an officer has to walk in while dealing with a stopped vehicle, a site of an accident, and the like. In the embodiment illustrated in FIG. 2, the edge device 110 is positioned at a rear of the work vehicle 30 (such as at the rear of a police cruiser, fire truck, or ambulance).

Figure 4:
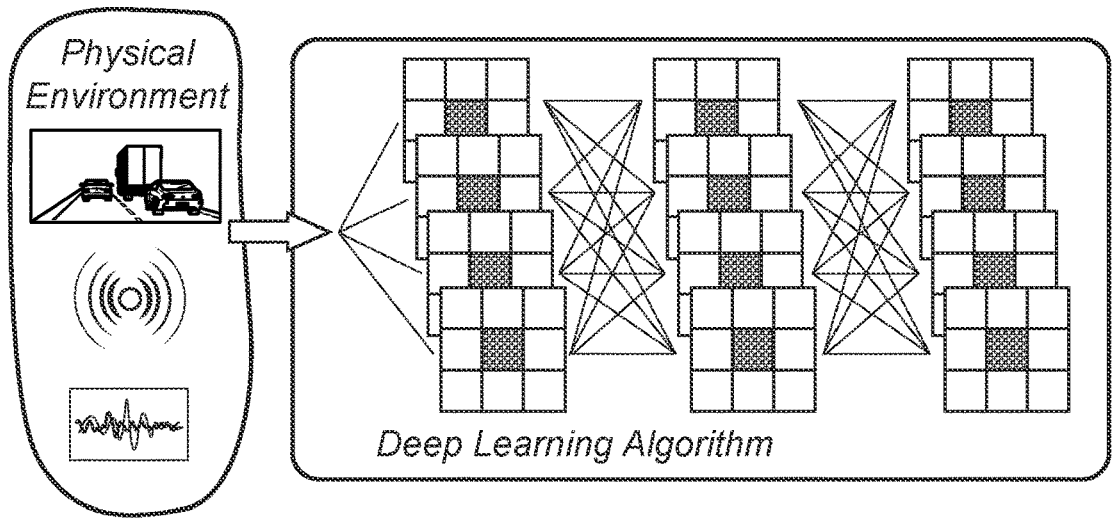
FIG. 4 is a schematic illustration of an integrative algorithm for real-time deep learning of the highway safety system in accordance with an embodiment of the present disclosure.
Figure 5:
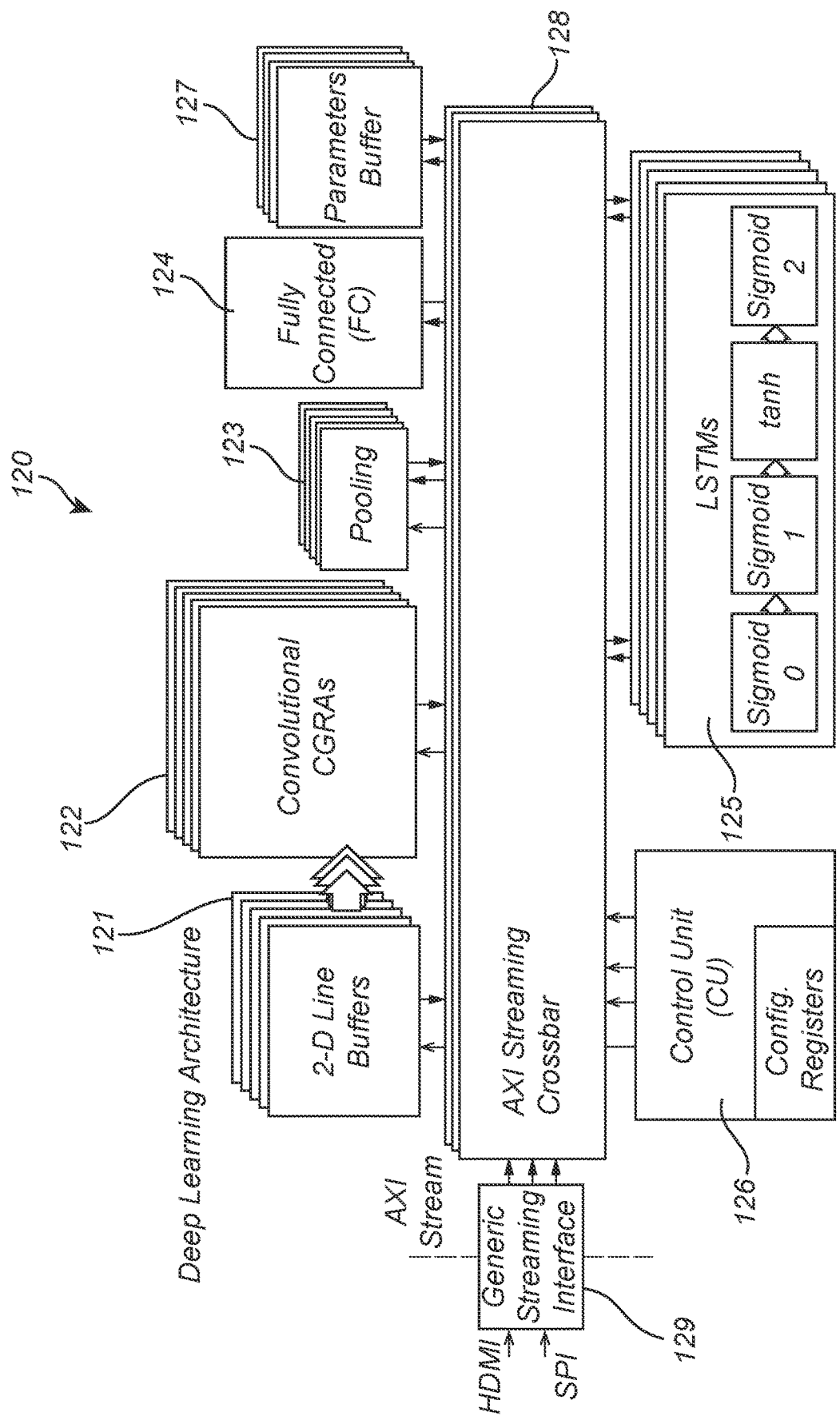
FIG. 5 is a block diagram of an integrative architecture for real-time deep learning of the highway safety system in accordance with an embodiment of the present disclosure.

FIG. 4 is a schematic illustration of an integrative algorithm for real-time deep learning of the highway safety system 100 in accordance with an embodiment of the present disclosure. FIG. 5 is a block diagram of a processor 120 with integrative architecture for real-time deep learning of the highway safety system 100 in accordance with an embodiment of the present disclosure. In embodiments, the edge device 110 includes the integrative architecture 120 illustrated in FIG. 5 and is configured to implement the algorithm disclosed in FIG. 4. In particular, the edge device 110 is configured to integrate an algorithm/architecture solution for real-time deep learning at the edge by performing vehicle detection and tracking over an input of streaming pixels (just-in-time processing). With this, both algorithm and integrative processor 120 do not need to store large batch sizes of image data for detecting and tracking patterns associated with danger in the work zone 90. Furthermore, just-in-time processing removes the privacy concerns associated with real-time data analytics, as the input data (images captured by the one or more cameras 111, 112) are destroyed right in the processing. In embodiments, no frame or row data is be stored.

In embodiments, the algorithmic framework is built on top of Convolutional Neural Networks (CNNs) that are configured for object detection and classifications by extracting deep features of the image data.

Figure 6:
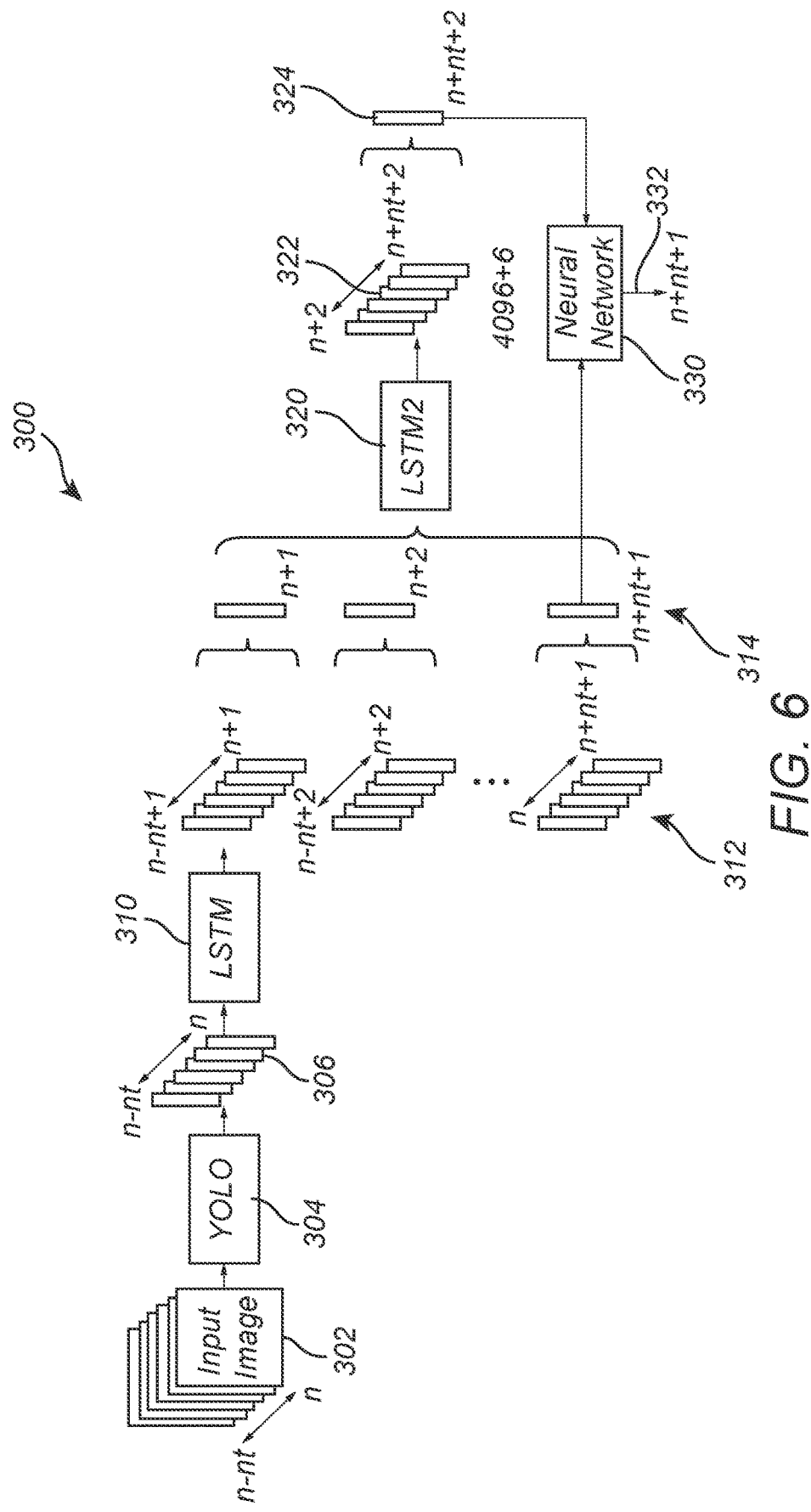
FIG. 6 is a block diagram of Sparse Stacked Long-Short Term Memory Units (LTSMs) for vehicle tracking and behavioral analysis in accordance with an embodiment of the present disclosure.

FIG. 6 is a block diagram of Sparse Stacked LTSMs 300 for vehicle tracking and behavioral analysis in accordance with an embodiment of the present disclosure. Referring to FIG. 6, the LSTMs 310, 320 are stacked on top of the CNNs to create a full end-to-end vehicle detection, classification, and tracking at the edge to capture complex time sequences 306, 312, 322 (and their outputs 314 and 324) for tracking and behavioral analysis of vehicles. The Sparce Stacked LTSMs 300 includes a scalable LSTM algorithm for tracking and time sequence analysis. In embodiments, the LSTM (tracking part) only relies on a feature vector as the output of a CNN 304 and objects coordinates (X, Y, length, height) per each output image 302. The number of hidden layers per each layer is equal to feature vectors generated by the CNN 304. In embodiments, the scalable LSTM algorithm is configured to operate with the assumption that multiple images from each of the one or more cameras 111, 112 are not available at the same time, which can result in significant memory savings and a reduction in memory access requests.

Referring again to FIG. 5, in embodiments, the processor 120 with integrative architecture includes sufficient programming to support different CNN and LSTM topologies, which enables real-time deep learning at the edge. The processor 120 with integrative architecture eliminates the overhead of instruction-level flexibility and unnecessary data movements. It further increases power efficiency by operating on (potentially high-bandwidth) input data streams directly from the one or more cameras 111, 112.

In embodiments, the processor 120 with integrative architecture includes five major computation blocks: (1) convolutional Coarse Grained Reconfigurable Architectures (CGRAs) 122, (2) 2-D line buffers 121, (3) pooling blocks 123, (4) fully connected blocks 124, and (5) LSTM Blocks 125. In embodiments, the processor 120 also includes a streaming crossbar 128, which provides an extensible interconnection layer for constructing various topological configurations. In embodiments, the processor 120 includes a dedicated Control Unit (CU) 126 configured for centralized scheduling and resource management. The CU 126 is configured to govern allocation and configuration of the convolutional CGRAs 122, pooling at the pooling blocks 123, and the 2-D line buffers 232 to construct a deep learning data-path.

In embodiments, the configuration of CNNs and LSTMs of the processor 120 include inherent spatial and temporal parallelism of CNN and LSTM layers, which can achieve real-time performance. In particular, the configuration of the processor 120 can provide sufficient flexibility and reconfigurability to support various topologies (number of convolution (CNV) layers, convolution size, and composition), which increases the versatility of the processor 120 (such as supporting different CNN topologies).

Figure 7:
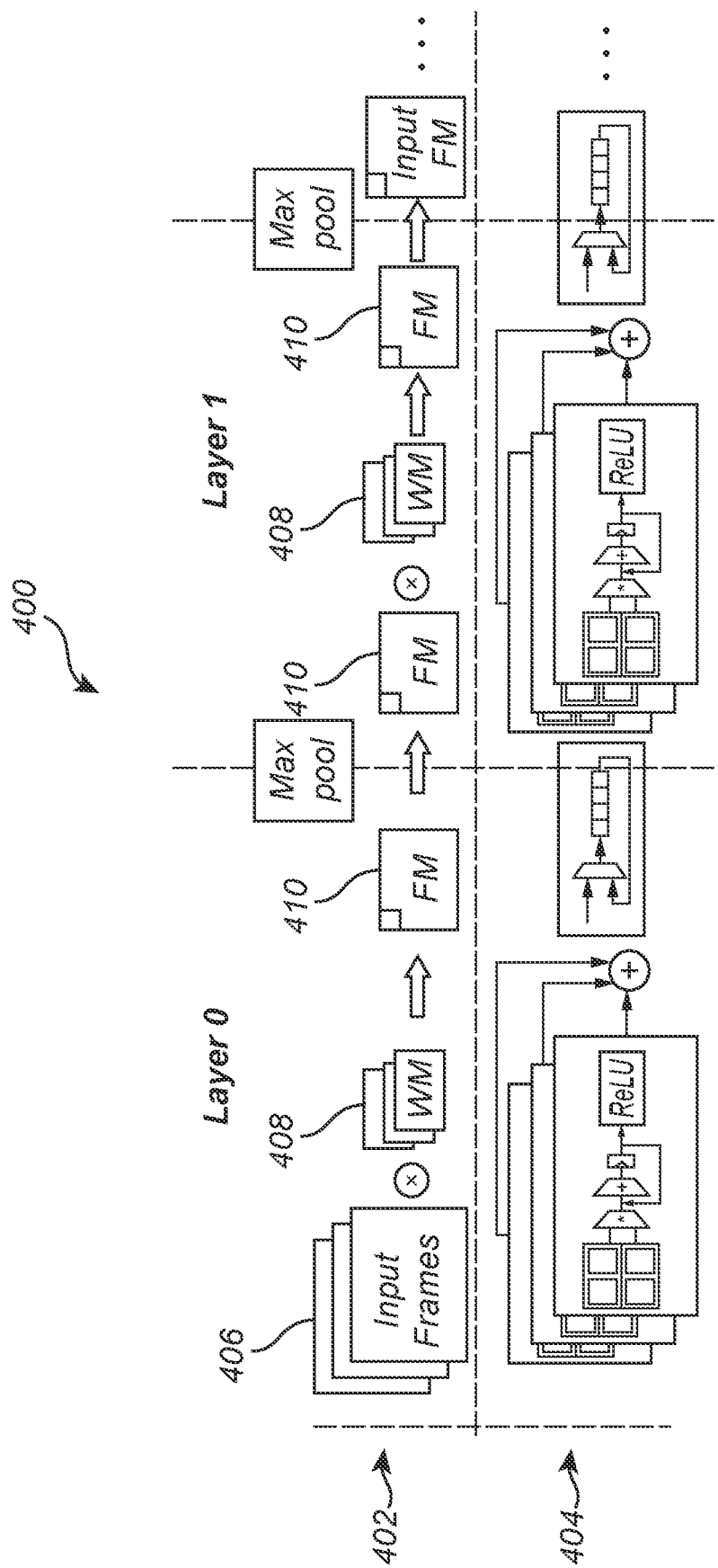
FIG. 7 is a block diagram of Logical Convolutional Neural Network to physical architecture mapping in accordance with an embodiment of the present disclosure.

FIG. 7 is a block diagram 400 of Logical Convolutional Neural Network to physical architecture mapping in accordance with an embodiment of the present disclosure. In particular, FIG. 7 illustrates logical flow 402 to physical implementation 404 mapping from the CNN algorithm to the processor 120. In embodiments, the logical flow 402 receives input frames 406 to which a weight matrix 408 is applied to obtain a feature map 410. The feature map 410 is then utilized as the input for the next iteration of the CNN algorithm until a probability distribution is obtained.

In embodiments, the Convolutional CGRAs 122 are configured to perform a bulk of computation using a convolutional CGRA template that is configured for convolutional operations over 2-D input data. In embodiments, for modularity, the convolutional CGRA template is arranged into two major stages: (1) data scaler and (2) data aggregator. This configuration utilizes the spatial and temporal parallelism intrinsic in 2-D convolutional operations. In the data scaler stage, a 2-D array of functional units performs the same operation (in embodiments, all share the same opcode) over the 2-D input data in a single cycle. The data aggregator then computes the output value for the middle data point in a pipelined fashion (using temporal parallelism). In embodiments, linear (as shown) or tree structured aggregators are possible. In embodiments, the Convolutional CGRAs 122 are configured to be parameterizable to allow for differently sized CGRAs within the processor 120. In embodiments, the processor 120 is configured for a maximal dimensionality (e.g. 13×13) as identified across all applications, and power-gating at runtime based on a required convolution size.

In embodiments, the 2-D line buffers 121 are configured to maximize reuse of the 2-D input data, which minimizes data movement. In particular, the 2-D line buffers 121 are configured to perform runtime on the fly streaming data reordering. In embodiments, the 2-D line buffers 121 are collections of First in First Out data structures (FIFOs) equal in size to an input frame line size. In embodiments, the FIFOs are configured to hold the vertically and horizontally neighbored data according to convolution dimensions. The FIFOs keep the necessary data on the chip in the 2-D line buffers 121, which minimizes external traffic (up to 25 fold for a 5×5 CGRA) and with this, maximize the utilization of the Convolutional CGRAs 122. In convolutional layers (CNV-layers), different convolutions are performed over the same input data (just with different coefficients). Therefore, in embodiments, multiple CGRAs 122 are configured to share the same 2-D line buffer 121, which further increases efficiency.

In embodiments, the pooling blocks 123 are configured to realize feature voting and aggregation before the process moves to the next CNV layer. In embodiments, on an algorithm level, pooling is realized as another 2-D operation which is mapped to another CGRA operation (such as the operation described above). In embodiments, the pooling blocks 123 are configured with a simple min/max selection, which reduces demand on-chip memory. In embodiments, the pooling blocks 123 are configured to include a FIFO to store the history of the previous decision and comparison logic, to pool between the new streaming data and the previously selected data (already stored in the FIFO).

The LSTM blocks 125 are configured to track the events over the time. In embodiments, the LSTM blocks 125 are configured to work on the output of the CNN(s) to track identified objects over a sequence of frames. In embodiments, each LSTM internally includes: (1) multiple "sigmoid" blocks, configured as an input gate layer, and configured to decide which values to update; and (2) a "tan h" block configured to normalize the values. In embodiments, direct communication between the blocks is performed via the streaming crossbar 128 (e.g. AXI streaming fabric). In embodiments, the streaming crossbar 128 includes multiple ports, such as a number of ports equivalent to the overall number of blocks.

In embodiments, the streaming crossbar 128 is configured to flexibly interconnect the convolutional CGRAs 122, the 2-D line buffers 121, and the pooling blocks 123. In embodiments, the streaming crossbar 128 includes a number of ports equivalent to the overall number of blocks and is configured to form concurrent flexible sparse connectivity between blocks.

Figure 8:
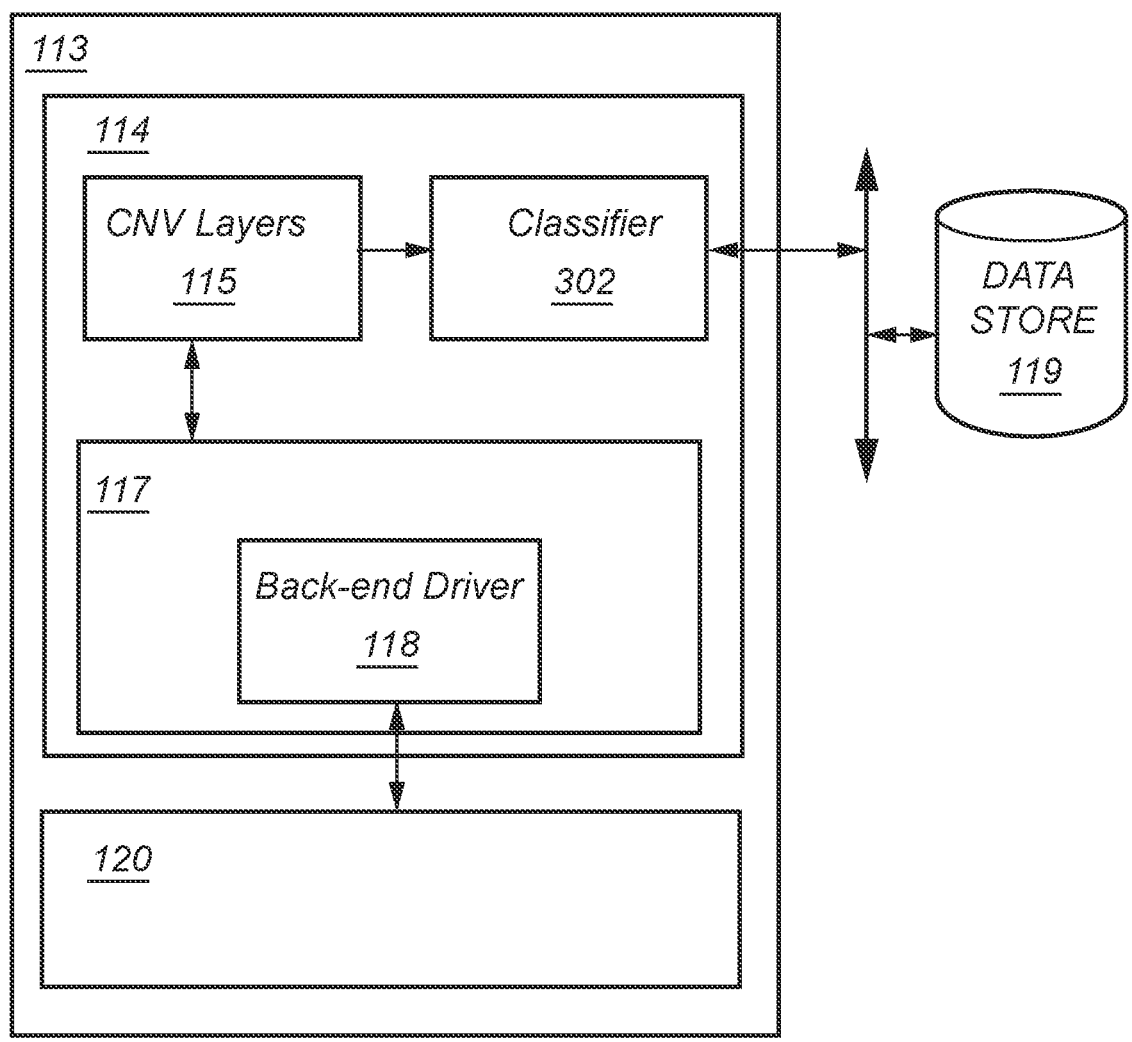
FIG. 8 is a block diagram of a processing architecture of the edge device in accordance with an embodiment of the present disclosure.

FIG. 8 is a block diagram of a processing architecture 113 of the edge device 100 in accordance with an embodiment of the present disclosure. In embodiments, the processing architecture 113 includes the processor 120 and a general purpose processor(s) 114 arranged in a heterogeneous combination. In embodiments, the processor 120 is dedicated for executing the convolution layer and the general-purpose processor(s) 113 is configured to execute (computer-executable instructions stored in memory) a user application 114 that includes CNV layers 115, a top-level classifier 116, and a control algorithm with the capability of running a Real-time OS, dedicated data-storage 119 for vision meta-data, and I/O and network interfaces.

In embodiments, the general purpose processor 113 is also configured to execute (computer-executable instructions stored in memory) a deep learning real-time-manager (RT-manager) 117. In embodiments, the RT-manager 117 translates application-level CNN and LSTM topological information to architecture-level target-specific provisioning. In embodiments, the RT-Manager 117 is configured to abstract away the configuration/programming details of the processor 120, only exposing a programming interface to application developers.

In embodiments, the RT-manager 117 includes a back-end driver 118 for the processor 120, which is configured with mechanisms for configuring the processor 120 with respect to the architecture-level topology. In embodiments, the back-end driver 118 is configured to manage resource allocation (convolutional CGRAs 122, 2-D line buffers 121, LSTMs 125, pooling blocks 123, refer to FIG. 5)) as well as frequency scaling. Furthermore, in embodiments, the RT-Manager 117 is configured to track available compute resources and performance of the processor 120, and is configured to adjust quality, performance and power consumption at run-time. In embodiments, the RT-Manager 117 is configured to provide runtime performance/quality feedback to the user application 114.

In embodiments, the processing architecture 113 is configured to offer just-in-time processing over streaming data, which mitigates privacy concerns associated with real-time monitoring. Indeed, in embodiments, the edge device 110 is configured to only transfer events to the one or more assisted reality devices 150 related to potential safety threats. Further, in embodiments, the highway safety system 100 is configured as a stand-alone platform with no need for continuous access to the Internet, a network with global access, or any network outside of the local network established for communication between the edge device 110 and the one or more assisted reality devices 150. As such the highway safety system 100 is less prone to cyber-attacks and potential functional manipulation. Further, in embodiments, the processing architecture 113 includes a Trusted Platform Module (TPM) integrated therein, which is configured to secure the real-time computation and communication on the edge device 110.

Figure 9:
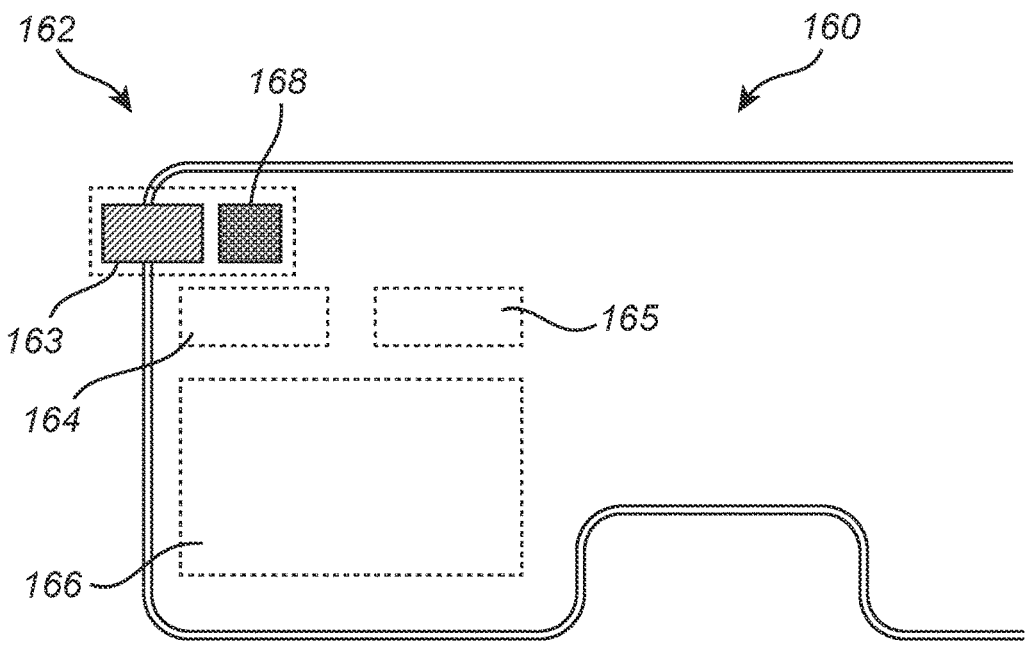
FIG. 9 is a block diagram of a User Interface (UI) of augmented reality glasses in accordance with an embodiment of the present disclosure

In embodiments, the highway safety system 100 is configured to provide instantaneous feedback once potential safety threats near a highway work zone is detected by the edge device 110. FIG. 9 is a block diagram of a User Interface (UI) 162 of augmented reality glasses 160 in accordance with an embodiment of the present disclosure. In embodiments, the UI 162 is a worker-interface configured to provide real-time information to the person 50 that possesses (such as by wearing) the augmented reality glasses 160. In embodiments, the UI 162 is configured to provide alerts to the person 50. In embodiments, the alerts include varying levels of warnings to the person 50 based on a severity of a danger, of a particular situation, determined by the edge device 110. In embodiments, the alerts include different visualization colors, different sounds (different patterns, different pitches, different volumes, etc.), as well as different durations of alarms to indicate the varying severity of the danger. In embodiments, the alert is given until either the danger dissipates or the person 50 moves to a safer location.

In embodiments, the UI 162 includes an input module 163, a traffic level indicator 164, a risk indicator 165, and a real-time visualized action recommendation indicator 166. In some embodiments, the input module 163 includes a microphone for receiving voice control commands and a camera for receiving gesture controls. The traffic level indicator 164 is configured to display an indication of a level of the traffic, such as by using color, different icons, or a size of an icon. In embodiments, the edge device 110 is configured to measure a level of the traffic and provide a signal indicating the determined level of traffic to at least one of the assisted reality devices 150. The risk indicator 165 is configured to display a level of risk determined by and received from the edge device 110. The real-time visualized action recommendation indicator 166 is configured to display an action for the person 50 to take. In embodiments, the action displayed is selected from a group of predetermined actions. In embodiments, the group of actions include get to safety, check traffic, and the like.

In embodiments, no video data is transferred from the edge device 110 to the one or more assisted reality devices 150. In these embodiments, only signals indicating one or more of a traffic level, an alarm level, and an alarm are sent from the edge device 110 to the assisted reality device 150. In embodiments, the network device 130 is configured to provide a Wireless Local Area Network (WLAN) to provide direct low latency communication between the edge device 110 and the one or more assisted reality devices 150. In embodiments, the communication is limited to a local area, without communication external to the WLAN.

Figure 10:
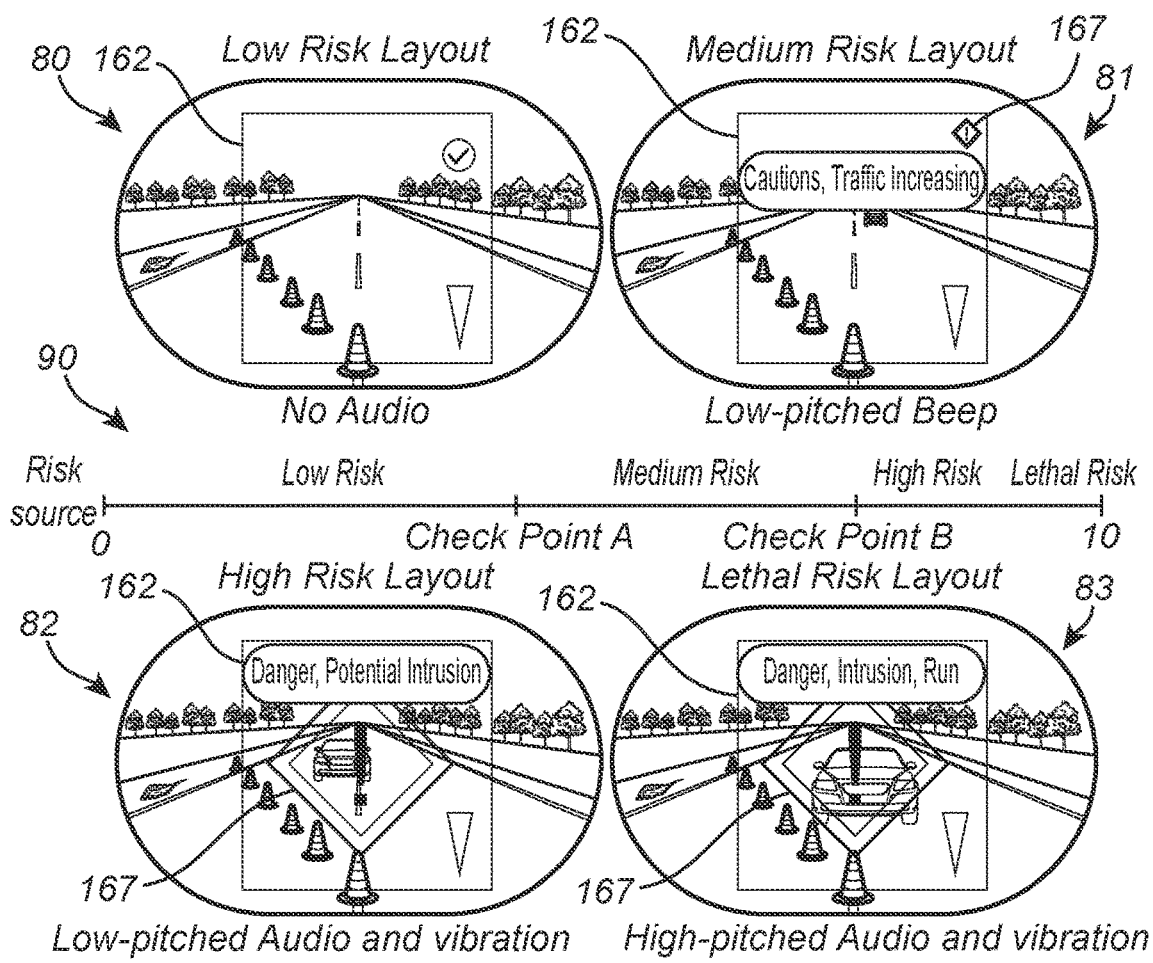
FIG. 10 is a schematic illustration of a visual warning in the UI overlayed over an associated risk layout.

FIG. 10 is a schematic illustration of a visual warning 167 in the UI 162 overlayed over an associated risk layout 80. As noted above, in embodiments, no video is transferred from the edge device 110 and the illustration of FIG. 10 is intended to show the correlation between the visual warning and a particular condition of a risk layout 80, 81, 82, 83 (such as the location of a vehicle in the road relative to the work zone). FIG. 10 also illustrates one embodiment of defining risk. In the embodiment illustrated, the risk is defined by a risk scale 90 that is from a minimum value, such as zero, to a maximum value, such as ten. In embodiments, the risk is defined by multiple risk levels. In some embodiments, the risk levels are defined by values within the risk scale 90. In the embodiment illustrated, the risk levels include a low risk, a medium risk, a high risk, and a lethal risk. Other risk levels and categories of risk levels are also contemplated.

In the embodiment illustrated in FIG. 10, the low risk level is associated to a low risk layout 80 where no vehicles traveling are towards the work zone and the UI 162 is configured to not display an alert icon 167 and the assisted reality devices 150 is configured to not cause a warning sound. The medium risk level is associated to a medium risk layout 81 where a vehicle is off at a distance and traveling in the general direction of the work zone and the UI 162 is configured to display a small alert icon 167 in the corner thereof and is configured to cause the assisted reality device 150 to emit a low-pitched beeping sound. The high risk level is associated to a high risk layout 82 where a vehicle is close to the work zone and moving towards the work zone and the UI 162 is configured to display a large icon alert 167 and is configured to cause the assisted reality device 150 to emit a low-pitched sound and vibration. In some of these embodiments, the alert icon 167 is large, centrally located and partially transparent, and includes a color, such as yellow, associated with a high risk. The lethal risk level is associated to a lethal risk layout 83 where a vehicle is about to breach the work zone and the UI 162 is configured to display a large icon alert 167 and is configured to cause the assisted reality device 150 to emit a high-pitched sound and vibration. In some of these embodiments, the alert icon 167 is large, centrally located and less transparent than that of the alert icon for the high risk layout, and includes a color, such red, associated with a lethal risk. The risk levels and alerts described with regards to FIG. 10 are exemplary in nature. Other layouts, alert types, alert icon 167 sizes, colors, levels of transparency, vibration patterns, sound patterns, sound pitches, and the like, are also contemplated for distinguishing between risk levels.

Figure 11:
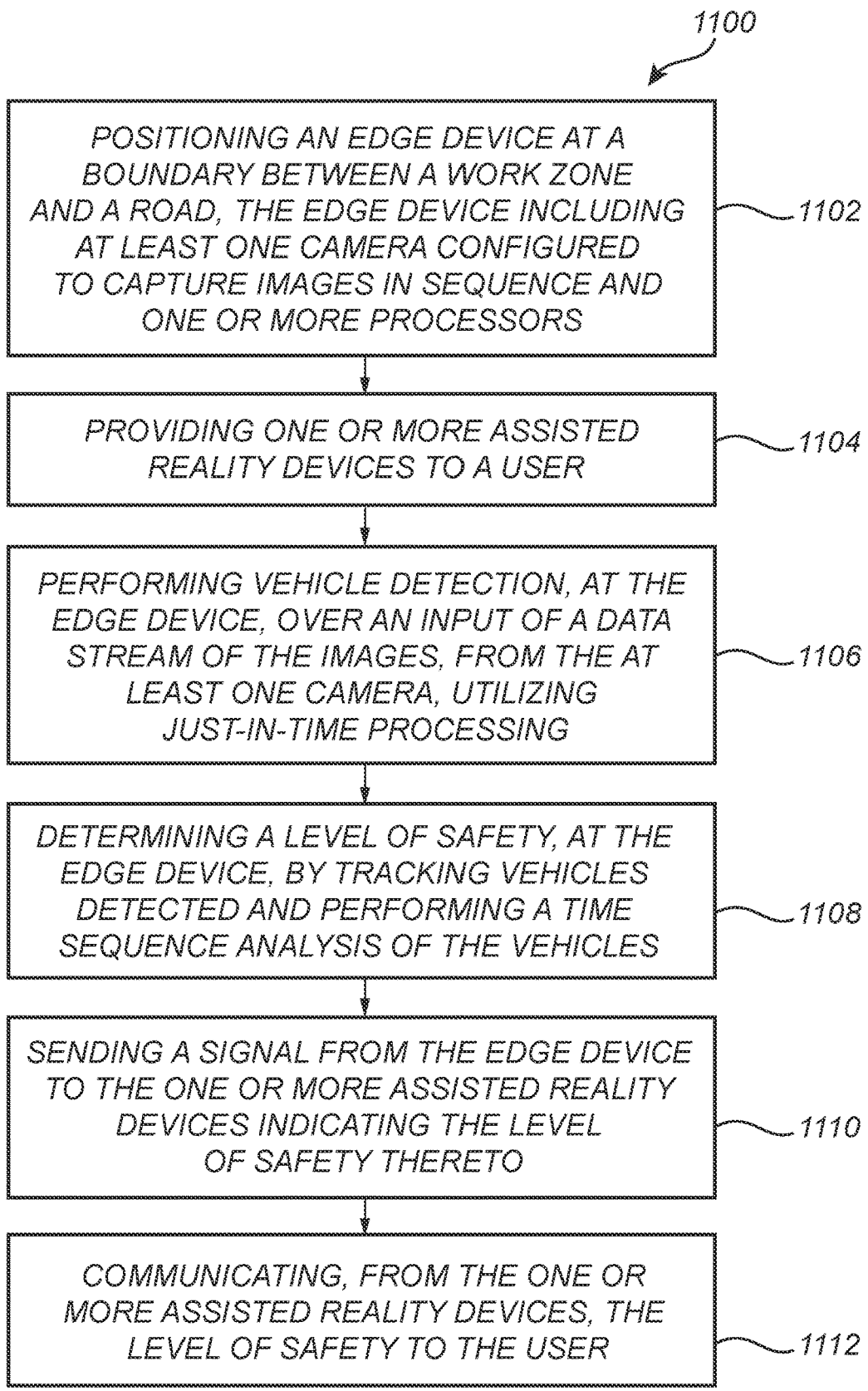
FIG. 11 is a flowchart of a method for highway work zone safety.

FIG. 11 is a flowchart of a method for highway work zone safety. The method includes positioning an edge device at a boundary between a work zone and a road, the edge device including at least one camera configured to capture images in sequence and one or more processors at step 1102. The method also includes providing one or more assisted reality devices to a user at step 1104. The method further includes performing vehicle detection, at the edge device, over an input of a data stream of the images, from the at least one camera, utilizing just-in-time processing at step 1106. The method yet further includes determining a level of safety, at the edge device, by tracking vehicles detected and performing a time sequence analysis of the vehicles at step 1108. The method still further includes sending a signal from the edge device to the one or more assisted reality devices indicating the level of safety thereto at step 1110. The method yet also includes communicating, from the one or more assisted reality devices, the level of safety to the user at step 1112.

In some embodiments, the one or more assisted reality devices is chosen from a smart watch and augmented reality glasses. In some embodiments, the vehicle detection is performed using CNNs, the one or more processors include LSTMs, and the level of safety is determined utilizing a scalable LSTM algorithm that relies on a feature vector of an output of the CNNs from each of the images. Optionally, the integrative processor includes programming to support different CNN and LSTM topologies and enables real-time deep learning thereon.

In some embodiments, the one or more processors includes an integrative processor and a general processor arranged in a heterogeneous combination. In some embodiments, the at least one camera is chosen from a red, green, blue camera and an infrared camera.

Figure 12:
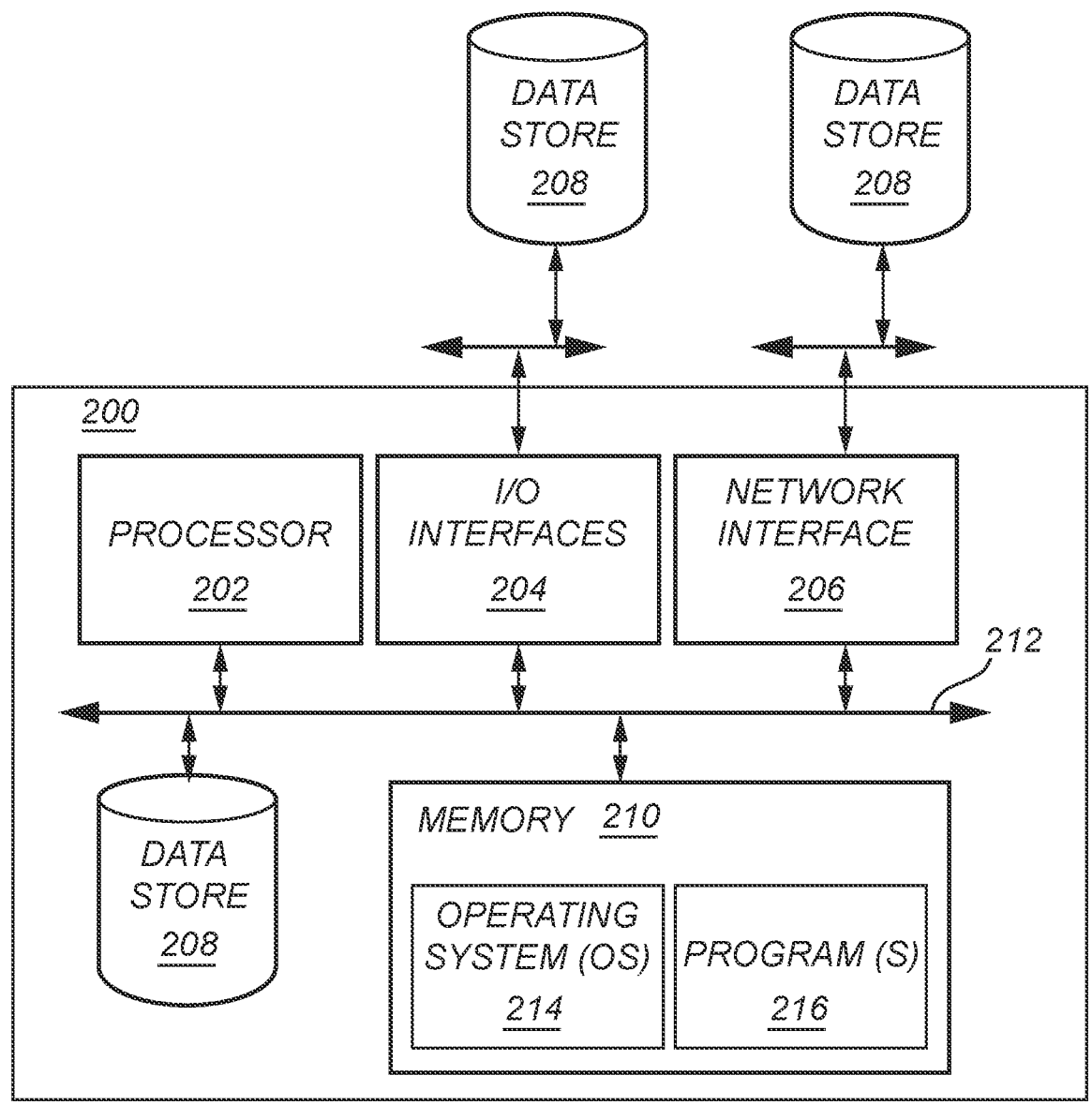
FIG. 12 is a block diagram of a device of the highway safety system in accordance with an embodiment of the present disclosure.

FIG. 12 is a block diagram of a device of the highway safety system 100 in accordance with an embodiment of the present disclosure. For example, the device 200 can be any of the edge device 110, the communication device 130, and an assisted reality device 150. In embodiments, the device 200 is a digital computer that, in terms of hardware architecture, generally includes a processor 202, input/output (I/O) interfaces 204, a network interface 206, a data store 208, and memory 2100. It should be appreciated by those of ordinary skill in the art that FIG. 12 depicts the device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the device 200, a semiconductor-based microprocessor (in the form of a microchip or chipset), or generally any device for executing software instructions. For example, as noted above, the processor 202 for the edge device 110 can include a general processor 116 and a DCNN processor 118. When the device 200 is in operation, the processor 202 is configured to execute software stored within the memory 210, to communicate data to and from the memory 210, and to generally control operations of the device 200 pursuant to the software instructions. The I/O interfaces 204 may be used to receive user input from and/or for providing system output to one or more devices or components.

The network interface 206 may be used to enable the device 200 to communicate on a network, such as a local network established between the devices of the highway safety system 100. The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the device 200, such as, for example, an internal hard drive connected to the local interface 212 in the device 200. Additionally, in another embodiment, the data store 208 may be located external to the device 200 such as, for example, an external hard drive connected to the I/O interfaces 204 (e.g., a SCSI or USB connection).

In embodiments, the memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An edge device for monitoring safety of a highway work zone and predicting vehicular intrusion into the highway work zone by vehicles and notifying a user of one or more assisted reality devices in the highway work zone before the vehicular intrusion enters the highway work zone, the edge device comprising:
at least one camera configured to capture images in sequence of the vehicles;
one or more processors; and
a memory storing computer-executable instructions that, when executed, cause the one or more processors to:
perform vehicle detection of the vehicles over an input of a data stream of the images via an input of streaming pixels, from the at least one camera, utilizing just-in-time processing to process a real-time feed from the at least one camera to predict a risk-causing event of a vehicular safety threat to the user, the event being the vehicular intrusion by the vehicles into the highway work zone;
determine a level of safety by tracking the vehicles detected and performing a time sequence analysis of the vehicles, wherein the images captured from the at least one camera are not stored; and
provide real-time alerts of varying levels of audio and visual warnings based on a severity of the vehicular safety threat determined by the edge device, which is located in the highway work zone or at a boundary of the highway work zone between the highway work zone and oncoming traffic, including sending a signal to the one or more assisted reality devices of the user in the highway work zone indicating the level of safety thereto to provide feedback to the user in the highway work zone as soon as the vehicular safety threat is detected by the edge device but before the vehicular safety threat enters the highway work zone to predict the vehicular intrusion into the highway work zone and notify the user of the one or more assisted reality devices before the vehicular safety threat enters the highway work zone to provide time for the user to avoid the vehicular safety threat, wherein the varying levels of warnings are based on risk values within a risk scale attuned to detected risk and vary based on a low risk defined as when no vehicle is detected traveling toward the work zone to high risk define as when the vehicle is moving toward the work zone, and processing employs a real-time deep learning algorithm;
wherein the edge device is configured to send the alerts only to the one or more assisted reality devices and the edge device is further configured to communicate with the one or more assisted reality devices through a local network established for communication between the edge device and the one or more assisted reality devices without requiring continuous access to the internet.

2. The edge device of claim 1, wherein the one or more processors include an integrative processor, the integrative processor including convolutional Coarse Grained Reconfigurable Architectures, 2-D line buffers, pooling blocks, fully connected blocks, and Long-Short Term Memory Units.

3. The edge device of claim 2, wherein the integrative processor further includes a streaming crossbar adapted to provide an interconnection layer for constructing various topological configurations.

4. The edge device of claim 1, wherein the vehicle detection is performed using Convolutional Neural Networks (CNNs), the one or more processors include Long-Short Term Memory Units (LSTMs), and the level of safety is determined utilizing a scalable LSTM algorithm that relies on a feature vector of an output of the CNNs from each of the images.

5. The edge device of claim 4, wherein the integrative processor includes programming to support different CNN and LSTM topologies and enables real-time deep learning thereon.

6. The edge device of claim 1, wherein the one or more processors includes an integrative processor and a general processor arranged in a heterogeneous combination.

7. The edge device of claim 1, wherein the at least one camera is chosen from a red, green, blue camera and an infrared camera.

8. A highway safety system, comprising
one or more assisted reality devices configured to communicate a level of safety to a user; and
an edge device for monitoring safety of a highway work zone and predicting vehicular intrusion into the highway work zone by vehicles and notifying a user of the one or more assisted reality devices in the highway work zone before the vehicular intrusion enters the highway work zone, the edge device including
at least one camera configured to capture images in sequence of the vehicles,
one or more processors, and
a memory storing computer-executable instructions that, when executed, cause the one or more processors to:
perform vehicle detection of the vehicles over an input of a data stream of the images via an input of streaming pixels, from the at least one camera, utilizing just-in-time processing to process a real-time feed from the at least one camera to predict a risk-causing event of a vehicular safety threat to the user, the even being the vehicular intrusion by the vehicles into the highway work zone;
determine the level of safety by tracking the vehicles detected and performing a time sequence analysis of the vehicles, wherein the images captured from the at least one camera are not stored; and
provide real-time alerts of varying levels of audio and visual warnings based on a severity of the vehicular safety threat determined by the edge device, which is located in the highway work zone or at a boundary of the highway work zone between the highway work zone and oncoming traffic, including sending a signal to the one or more assisted reality devices of a user in the work zone indicating the level of safety thereto to provide feedback to the user in the work-zone as soon as the vehicular safety threat is detected by the edge device but before the vehicular safety threat enters the highway work zone to predict the vehicular intrusion in the highway work zone and notify the user of the one or more assisted realty devices before the vehicular safety threat enters the highway work zone to provide time for the user to avoid the vehicular safety threat, wherein the varying levels of warnings are based on risk values within a risk scale attuned to detected risk and vary based on a low risk defined as when no vehicle is detected traveling toward the work zone to high risk define as when the vehicle is moving toward the work zone, and processing employs a real-time deep learning algorithm;

wherein the edge device is configured to send the alerts only to the one or more assisted reality devices and the edge device is further configured to communicate with the one or more assisted reality devices through a local network established for communication between the edge device and the one or more assisted reality devices without requiring continuous access to the internet.

9. The highway safety system of claim 8, wherein the one or more assisted reality devices is chosen from a smart watch and augmented reality glasses.

10. The highway safety system of claim 8, further comprising a network device configured to connect the edge device to the one or more assisted reality devices via a Wireless Local Area Network.

11. The highway safety system of claim 8, wherein the vehicle detection is performed using Convolutional Neural Networks (CNNs), the one or more processors include Long-Short Term Memory Units (LSTMs), and the level of safety is determined utilizing a scalable LSTM algorithm that relies on a feature vector of an output of the CNNs from each of the images.

12. The highway safety system of claim 11, wherein the integrative processor includes programming to support different CNN and LSTM topologies and enables real-time deep learning thereon.

13. The highway safety system of claim 8, wherein the one or more processors includes an integrative processor and a general processor arranged in a heterogeneous combination.

14. The highway safety system of claim 8, wherein the at least one camera is chosen from a red, green, blue camera and an infrared camera.

15. A method for monitoring safety of a highway work zone and predicting vehicular intrusion into the highway work zone by vehicles and notifying a user of one or more assisted reality devices in the highway work zone before the vehicular intrusion enters the highway work zone, the method comprising:

positioning an edge device at a boundary between a work zone and a road or in the work zone, the edge device including at least one camera configured to capture images in sequence of the vehicles and one or more processors;

providing the one or more assisted reality devices to the user;

performing vehicle detection of the vehicles, at the edge device, over an input of a data stream of the images via an input of streaming pixels, from the at least one camera, utilizing just-in-time processing to process a real-time feed from the at least one camera to predict a risk-causing event of a vehicular safety threat to the user, the event being the vehicular intrusion by the vehicles into the work zone;

determining a level of safety, at the edge device, by tracking the vehicles detected and performing a time sequence analysis of the vehicles, wherein the images captured from the at least one camera are not stored;

providing real-time alerts of varying levels of audio and visual warnings based on a severity of the vehicular safety threat determined by the edge device, including sending a signal from the edge device to the one or more assisted reality devices of the user in the work zone indicating the level of safety thereto to provide instantaneous feedback to the user in the work zone as soon as the safety threat is detected by the edge device but before the vehicular safety threat enters the work zone to predict the vehicular intrusion into to work zone and notify the user of the one or more assisted reality devices before the vehicular safety threat enters the work zone to provide time for the user to avoid the vehicular safety threat, wherein the varying levels of warnings are based on risk values within a risk scale attuned to detected risk and vary based on a low risk defined as when no vehicle is detected traveling toward the work zone to high risk defined as when the vehicle is moving toward the work zone, and processing employs a real-time deep learning algorithm; and communicating, from the one or more assisted reality devices, the level of safety to the user; wherein the edge device sends the alerts only to the one or more assisted reality devices and the edge device communicates with the one or more assisted reality devices through a local network established for communication between the edge device and the one or more assisted reality devices without requiring continuous access to the internet.

16. The method of claim 15, wherein the one or more assisted reality devices is chosen from a smart watch and augmented reality glasses.

17. The method of claim 15, wherein the vehicle detection is performed using Convolutional Neural Networks (CNNs), the one or more processors include Long-Short Term Memory Units (LSTMs), and the level of safety is determined utilizing a scalable LSTM algorithm that relies on a feature vector of an output of the CNNs from each of the images.

18. The method of claim 17, wherein the integrative processor includes programming to support different CNN and LSTM topologies and enables real-time deep learning thereon.

19. The method of claim 15, wherein the one or more processors includes an integrative processor and a general processor arranged in a heterogeneous combination.

20. The method of claim 15, wherein the at least one camera is chosen from a red, green, blue camera and an infrared camera.

* * * * *